(No Model.) 3 Sheets—Sheet 1.

F. EGGE.
MACHINE FOR STITCHING AND CUTTING BUTTON HOLES.

No. 362,945. Patented May 17, 1887.

Witnesses
S. S. Williamson
W. T. Haviland

Inventor
Frederick Egge
By Smith & Hubbard
Attys.

(No Model.) 3 Sheets—Sheet 2.

F. EGGE.

MACHINE FOR STITCHING AND CUTTING BUTTON HOLES.

No. 362,945. Patented May 17, 1887.

Witnesses
S. S. Williamson
W. T. Haviland

Inventor
Frederick Egge
By Smith & Hubbard
Attys.

(No Model.) 3 Sheets—Sheet 3.

F. EGGE.
MACHINE FOR STITCHING AND CUTTING BUTTON HOLES.

No. 362,945. Patented May 17, 1887.

Witnesses
S. S. Williamson
W. T. Haviland

Inventor
Frederick Egge
By Smith & Hubbard
Attys.

N. PETERS, Photo-Lithographer, Washington, D. C.

UNITED STATES PATENT OFFICE.

FREDERICK EGGE, OF BRIDGEPORT, CONNECTICUT, ASSIGNOR TO THE SMITH & EGGE MANUFACTURING COMPANY, OF SAME PLACE.

MACHINE FOR STITCHING AND CUTTING BUTTON-HOLES.

SPECIFICATION forming part of Letters Patent No. 362,945, dated May 17, 1887.

Application filed November 13, 1886. Serial No. 218,759. (No model.)

*To all whom it may concern:*

Be it known that I, FREDERICK EGGE, a citizen of the United States, residing at Bridgeport, in the county of Fairfield and State of Connecticut, have invented certain new and useful Improvements in Machines for Stitching and Cutting Button-Holes; and I do hereby declare the following to be a full, clear, and exact description of the invention, such as will enable others skilled in the art to which it appertains to make and use the same.

My invention relates to certain new and useful improvements in button-hole sewing-machines, but has especial reference to devices for cutting the button-hole simultaneously with the sewing thereof, and has for its object to simplify the construction shown in my Letters Patent No. 345,419, dated July 13, 1886; and with these ends in view my invention consists in the details of construction and combination of elements hereinafter fully set forth, and then specifically designated by the claims.

In order that those skilled in the art to which my invention appertains may fully understand its construction and operation, I will proceed to describe the same in detail, referring by letter to the accompanying drawings, forming a part of this specification, in which—

Figure 1:
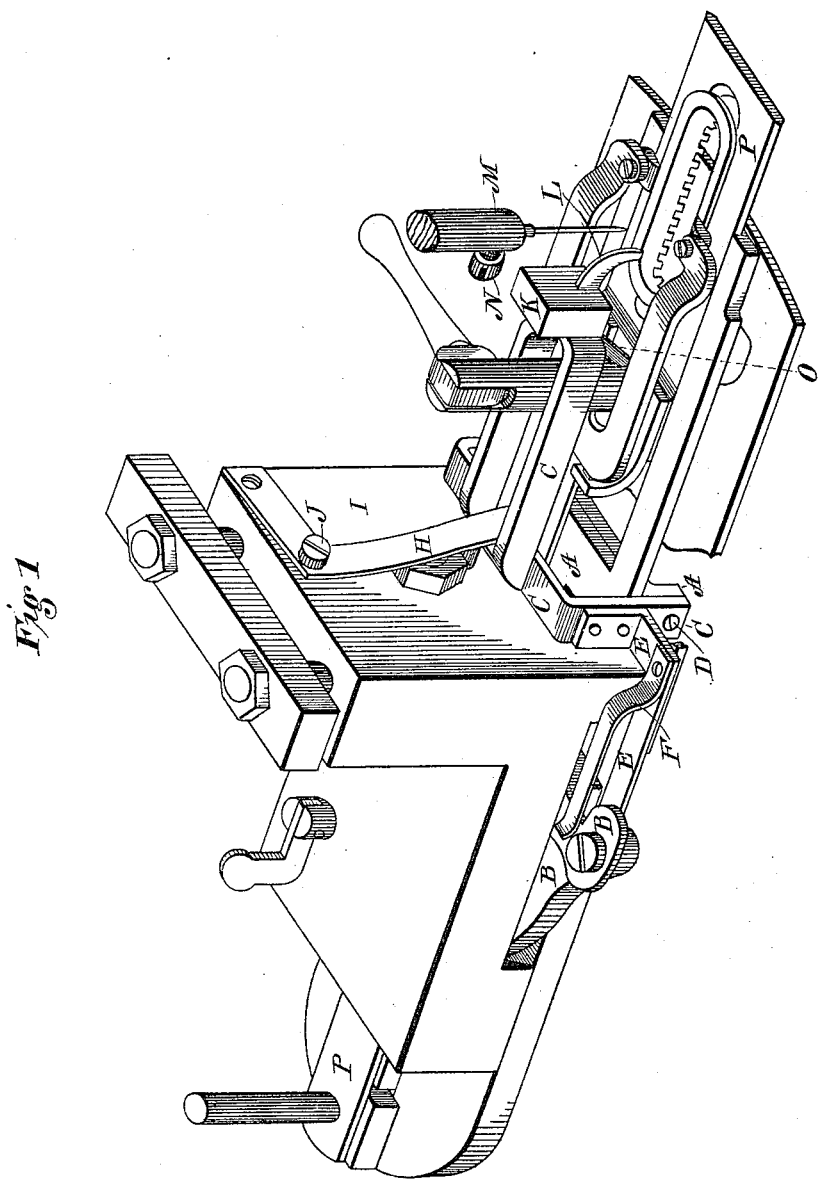
Figure 2:
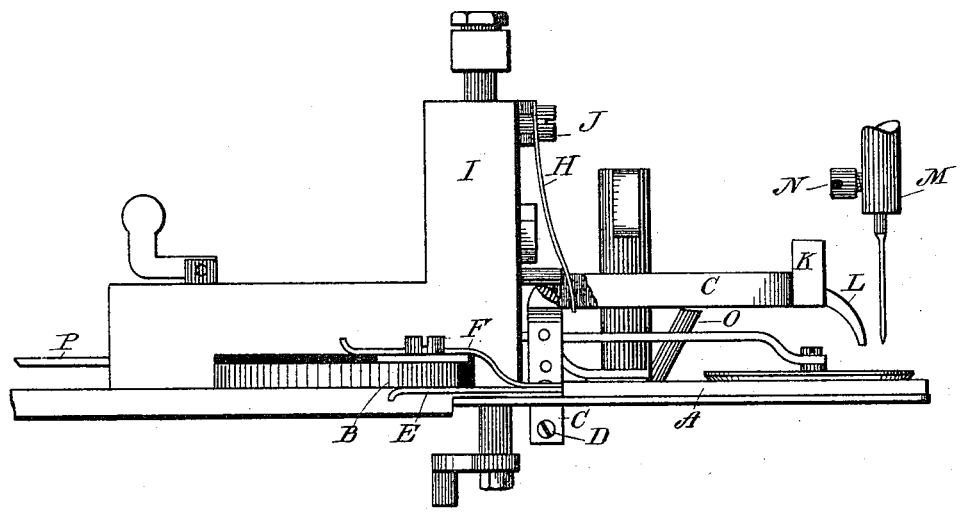
Figure 3:
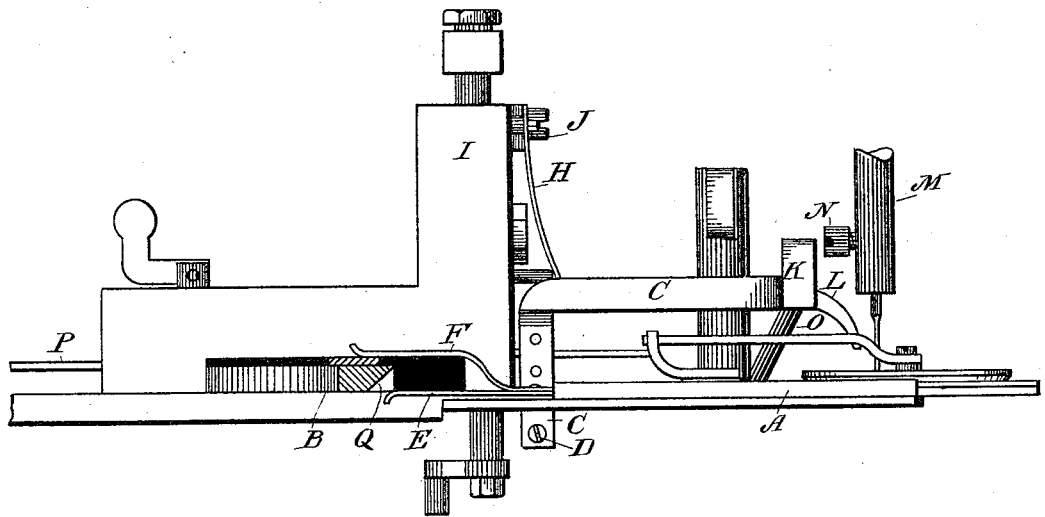
Figure 4:
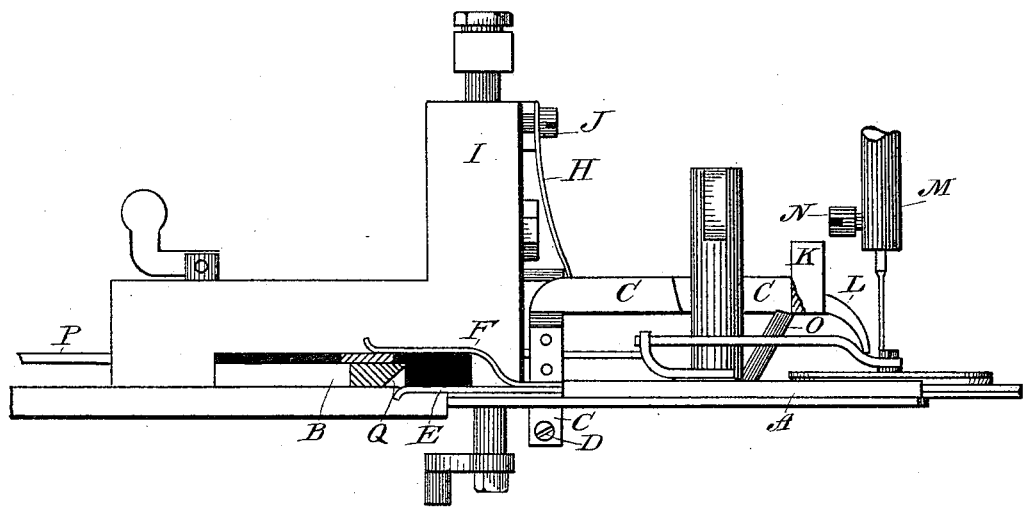

Figure 1 is a perspective showing my improvement attached to what is known as the "Universal" button-hole sewing-machine; Fig. 2, a side elevation showing the relative position of the several parts of my improvement immediately prior to stitching a button-hole; Fig. 3, a similar view after one side has been sewed; Fig. 4, a similar view after the other side of the button-hole has been stitched far enough to bring the cutter within the row of barring-stitches, the cutter-head being shown as barely resting on the pin; and Fig. 5, a similar view showing the cutter dropped and the position of the head thereof relative to the needle-bar.

Similar letters denote like parts in the several figures of the drawings.

I have shown my improvement applied to the button-hole sewing-machine illustrated and described in Letters Patent of the United States No. 206,768, granted August 6, 1878, to S. J. Baird, and it is not deemed necessary, therefore, to show by the drawings and herein specifically describe the parts of the machine which form the subject-matter of said patent—such as the means employed to effect the oscillation and feeding, or to hold the fabric while the button-hole is stitched, or the devices instrumental in operating the shifting-plate—said parts and mechanisms being fully set forth in said patent and forming no part of my present improvement.

A is the oscillator, and B the shifting-plate, constructed and arranged as in the aforesaid patent.

C is the cutter-frame pivoted to the oscillator, as seen at D, so as to be capable of a vertically-reciprocating movement.

E is a lever formed integral with or rigidly secured to the heel of the frame and projecting rearward therefrom.

F is a bow-spring secured to the lever for the purpose presently explained.

The shifting-plate B, immediately prior to the stitching of the button-hole from front to rear—that is, during the outward feed—is embraced by said lever and spring, as shown at Fig. 2, the object of this being to depress the lever to a horizontal plane, and thereby elevate the cutter-frame, for the purpose presently explained.

H is a flat spring secured to the turret I, and extending in normal position a slight distance beyond the frame when the latter is elevated to a horizontal plane, as shown at Fig. 2. This spring may be adjusted to a greater or less distance from the frame by means of the screw J, which passes through said spring into the turret.

K is the cutter-head secured at the outer extremity of the frame, and L is the cutter secured within said head.

Figure 5:
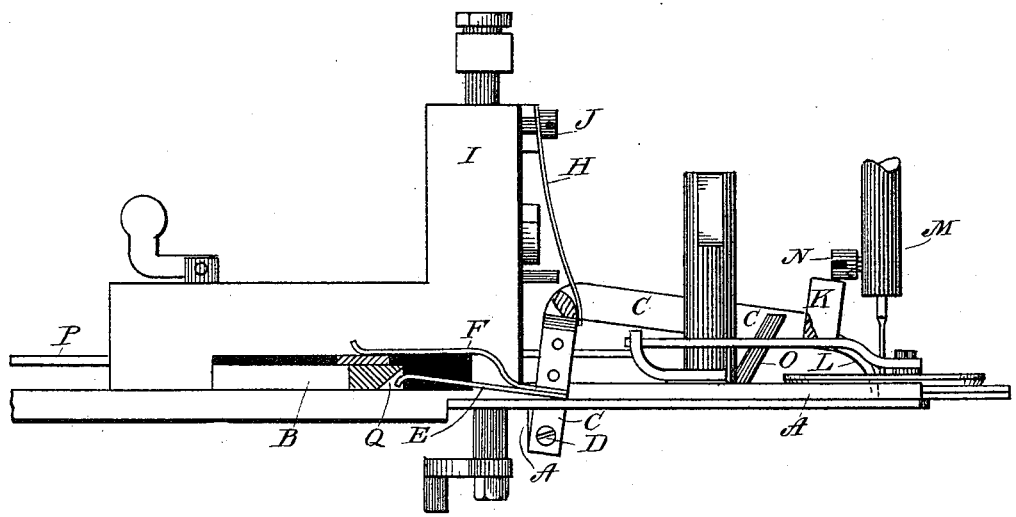

M is the needle-bar. The relative position of the needle-bar and the cutter-head is such that when the frame shall have dropped down the head will be within the field of operation of the needle-bar screw N in a vertical plane, as shown at Fig. 5, and when the frame shall have been elevated the said head will be without the field of operation of the needle-bar screw, as seen at Fig. 2. In this connection I wish to remark that the needle-bar may be shouldered or a collar or similar attachment secured thereto, which shall perform the office of the needle-bar secured in operating on the cutter-head, the screw being brought into service merely for the sake of convenience.

O is a pin secured to the feed-bar P. When the button-hole has been stitched during the outward feed of the bar P, the pin O will have been brought directly underneath the cutter-head, as shown at Fig. 2, and after the barring has been effected the shifting-plate will have been carried beyond the lever E, so that the action of the spring F will force the cutter-head down on the pin, as also seen at Fig. 2. Now, when the feed-bar moves backward, the stitching of the other side of the button-hole commences; but the cutter does not operate, since it is upheld by the pin, and it will not operate until the feed-bar has moved backward sufficiently to withdraw the pin from under the cutter-head. The reason for this is obvious, since if the cutter were operated simultaneously with the commencement of the stitching during the backward feed the barring-stitches would be cut through, since the cutter is in the rear of the needle. Therefore during the initial backward feed the cutter-head rests on the pin until the operating field of the cutter is within the row of barring-stitches, when the pin is withdrawn and the cutter-frame drops forward against the spring H, thus bringing the cutter-head within the field of operation of the needle-bar screw, as seen at Fig. 5.

Now, as the needle-bar descends, the screw will strike against the cutter-head and force the cutter against the resiliency of the spring H within the fabric, and when the needle-bar rises the action of the spring H will force the cutter-frame upward, and thereby cause the cutter to be lifted clear of the fabric, so as not to impede the feeding movement, and in position to be again operated.

When the button-hole is barred at the outer end, after the backward feed has been accomplished, the shifting-plate G will be again thrown between the lever E and spring F, the said plate being beveled or cut away, as seen at Q, to facilitate this movement, and the cutter-frame will be thereby elevated to its normal position, as seen at Fig. 2.

The spring F has a constant bearing against the plate G, and is longer than the lever E, so that when said plate has been shifted clear of the lever the spring will tend to force the cutter-frame down. The spring H has a double function. It acts as a stop to prevent the forcing of the cutter within the fabric by the action of the spring F after the pin O has been withdrawn from underneath the cutter-head, and it lifts the cutter from the fabric during the upstroke of the needle-bar after the latter has operated the cutter.

It is of course obvious that the cutter may be so arranged as to cut the button-hole during the stitching of either side thereof, or the cutter may be made to operate in advance of the stitching, whereby the button-hole may be sewed immediately after the successive operations of the cutter.

Having thus described my invention, what I claim as new, and desire to secure by Letters Patent, is—

1. The combination, with the cutter-frame pivoted to the oscillator, and having secured in the forward extremity the cutter, of the lever secured to or formed with the frame, the bow-spring secured to said lever, means—as the shifting mechanism or the parts controlled thereby—for elevating said frame to its normal position, a spring adapted to raise the cutter from the fabric during the operation of cutting and at the upstroke of the needle-bar, and means, carried or controlled by the feed-bar, for keeping the cutter-head outside of the field of operation of the needle-bar screw until the barring-stitches have been carried outside of the field of the cutter, substantially as shown and described.

2. In a button-hole sewing-machine, the combination, with a frame pivoted to the oscillator, and having secured in its forward extremity the cutter, and a lever secured to or formed with said frame and projecting rearward therefrom, of means—as the oscillator or mechanism controlled thereby—for depressing said lever and thereby elevating the frame, a spring adapted to throw the frame forward when the latter is not held in elevated position, thereby bringing the cutter-head within the field of operation of the needle-bar screw or other analogous device, a spring adapted to raise the frame after each successive operation of the needle-bar screw or analogous device against the cutter-head, whereby the cutter will not interfere with the feeding of the fabric, and means—as a pin or other device carried or operated by the feed-bar—for keeping the cutter-head within the field of operation of the needle-bar screw or other analogous device carried by the feed-bar outside of the field of operation of the cutter, substantially as shown, and for the purpose hereinbefore described.

In testimony whereof I affix my signature in presence of two witnesses.

FREDERICK EGGE.

Witnesses:
W. T. HAVILAND,
F. W. SMITH, Jr.